B. DANZIGER.
FILTER.
APPLICATION FILED JULY 12, 1911.

1,029,915.

Patented June 18, 1912.

2 SHEETS—SHEET 1.

WITNESSES:

INVENTOR.
Bruno Danziger
BY
ATTORNEYS

B. DANZIGER.
FILTER.
APPLICATION FILED JULY 12, 1911.

1,029,915.

Patented June 18, 1912.
2 SHEETS—SHEET 2.

WITNESSES:

INVENTOR.
Bruno Danziger
BY
ATTORNEYS

UNITED STATES PATENT OFFICE.

BENNO DANZIGER, OF MANNHEIM, GERMANY, ASSIGNOR TO NATHAN H. HEYMAN, OF NEW YORK, N. Y.

FILTER.

1,029,915.  Specification of Letters Patent.  Patented June 18, 1912.

Application filed July 12, 1911. Serial No. 638,062.

*To all whom it may concern:*

Be it known that I, BENNO DANZIGER, a subject of the Grand Duke of Baden, residing at 29 Carl-Ludwigstrasse, Mannheim, Germany, have invented the new and useful Improvements in Filters hereinafter fully set forth.

The invention is a filter for liquids such as beer, and is more especially an improvement in that type of liquid filter which is composed of a plurality of sections or individual filter elements compressed together in a suitable frame and forming when thus assembled a continuous filter drum with the filter mass and suitable liquid and gas conduits contained therein.

The object of the invention is to improve the capacity, efficiency and durability of such filters, as well as to improve the convenience with which they may be set up and taken apart and cleansed, all of which will in full appear from the description below and the accompanying two sheets of drawings forming part hereof.

Figure 1:
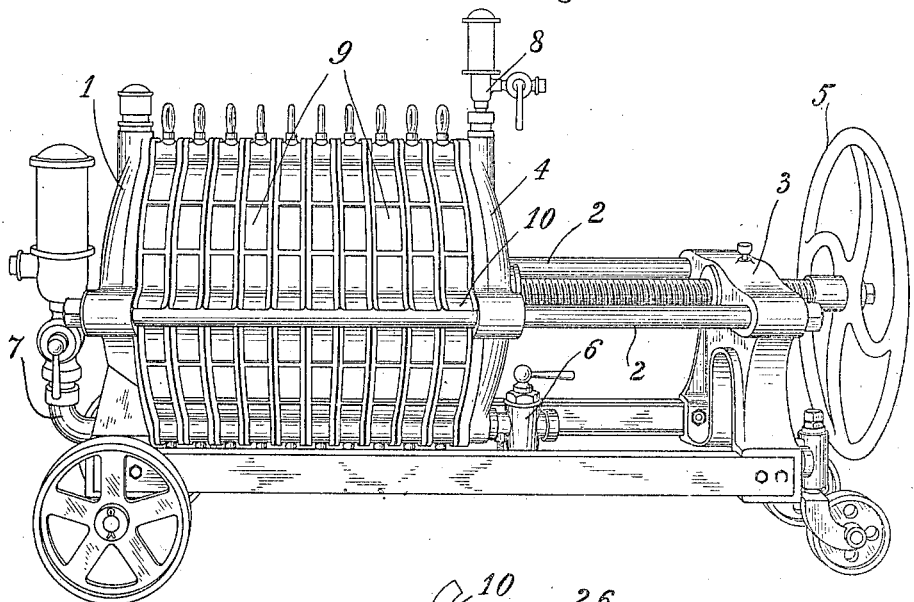
Figure 2:
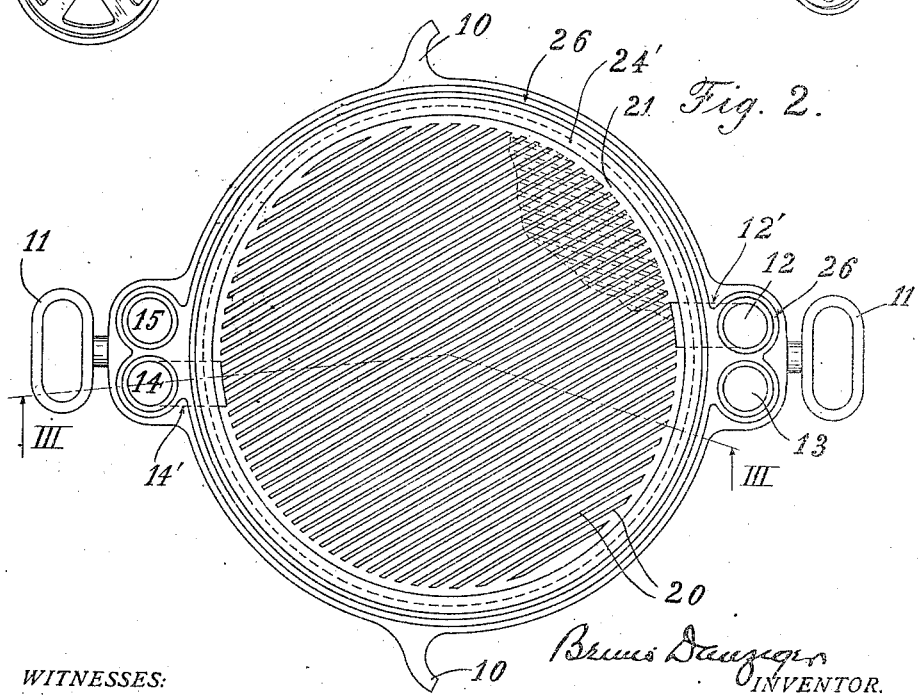
Figure 3:
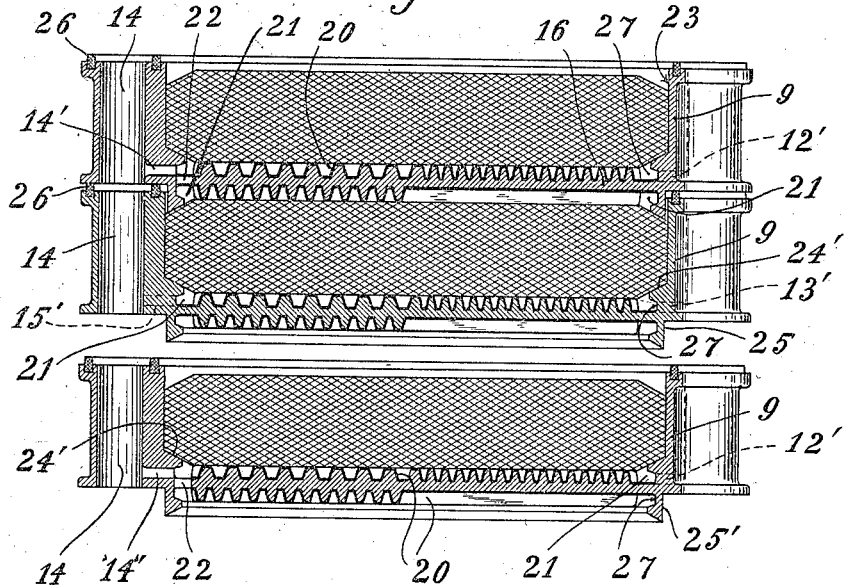

In said drawings, Figure 1 is a perspective view of a filter press constructed in accordance with this invention; Fig. 2 a plan view on enlarged scale of one of the filter elements thereof; Fig. 3 a section of several adjacent filter elements taken on the staggered line III—III of Fig. 2; and Fig. 4 is a similar section of a pair of assembled elements of modified form, but taken on the same section line as Fig. 3.

The frame or press shown in Fig. 1 comprises a terminal foot plate 1 connected by two parallel side bars 2, with a head standard 3, all of which parts are mounted on a suitable under-frame provided with wheels or casters. The frame also comprises a movable terminal head-plate 4, which is adapted to slide on the side bars under the action of the screw and hand-wheel 5. The several filter elements are adapted to be hung upon parallel side bars between the terminal plates 1 and 4, in which position they may be all pressed together by the appropriate operation of the hand-wheel so as to form liquid-tight joints between each other, and the two terminal plates thus producing a continuous though sectional, filter drum or casing through which the liquid to be filtered is passed. The liquid inlet, which is marked 6, may be connected to the movable head plate 4, and the outlet 7 to the stationary foot plate 1, or in any other suitable manner, as will be made apparent farther on. The casing is preferably disposed upon the frame in a horizontal position, and a gas escape cock 8 is provided at the top of the head plate.

The filter elements each consist of a shell wall 9 which is desirably though not necessarily made of circular section and provided with opposite hooks or ears 10 by which it may rest in a vertical position upon the side bars 2 of the press. It is also conveniently supplied with handles 11 by which it may be lifted. In the side or margin of the shell which is lowest when it is in position in the press, there is provided a pair of perforations which are adapted to register with corresponding perforations in adjacent shells to form longitudinal conduits through the filter drum wall. One of these conduits, marked 12 in the drawing, is intended to conduct the turbid liquid to the filter mass, and the other, marked 13, to conduct the clear liquid from it, for which purpose the perforation 12 in each alternate shell is connected by a branch passage 12' with the interior of the shell wall, while the perforation 13 in the intervening elements is connected by a similar branch passage 13' (see dotted lines in Figs. 3 and 4) with the interior of their shell walls. The interior of each successive element in the series is thus connected with its conduit perforation 12 and 13 in alternation. At the side of each shell wall which is uppermost in the filter press, a duplicate pair of conduit perforations 14 and 15 is provided, which perforations are similarly connected by passages 14' and 15' respectively and in alternation, with the interiors of their respective shells. The conduits formed by these upper registering perforations serve to collect and lead away the gas that may escape from the liquid passing through the filter, without, however, forming a by-pass for such liquid by which it may escape passage through the filter mass. Except for the difference in the connection of the interior of the shells with their conduit perforations, the several elements are or may be all duplicates of each other in structure. The perforations 12, 13, 14 and 15 are conveniently formed in projecting lugs at the top and bottom of each shell wall, as shown in the drawings.

Figure 4:
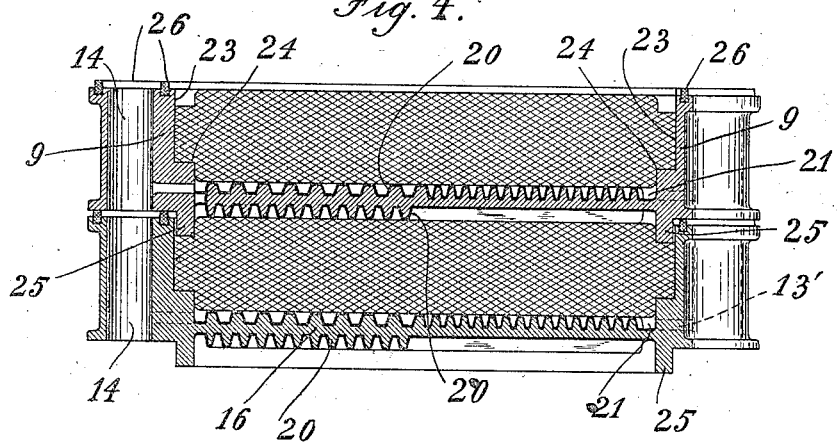

The filter mass is contained within the shell wall of the pan-shaped element, resting against a septum plate or bottom wall 16 thereof, and confined in each element, when they are assembled, by the bottom wall of the adjacent element, as clearly indicated in Figs. 3 and 4. The filter mass may be previously formed if desired, and may be set in place when either wet or dry. The wall or plate is preferably formed of rubber or of metal with a surface of rubber or similar material which is neutral to the liquid being filtered, and it is permanently secured to the shell wall at a point adjacent to the branch passages 12' and 14' or 13' and 15', as the case may be. The mode of attachment of the plate to the shell is not of importance; they may be integral with each other as indicated in the drawing. The plate 16 is formed with a ribbed surface on both its sides, the ribs 20 on each side being disposed at an angle to those on the other as indicated by the dotted lines in Fig. 2, and being free from perforations of any kind throughout the surface thereof with which the pulp or filter mass has contact. The ribs and grooves terminate short of the periphery of the exposed face of the plate so as to leave an annular passageway or canal 21 surrounding the ribs on both sides of the plate and through which the liquid may flow, and a slot 22 is cut or formed in this peripheral portion of each plate to establish communication between the said canals on opposite sides thereof and between both of these canals and the liquid conduits 12 or 13 as well as the gas conduits 14 or 15 above referred to. The non-uniform bearing of the compressed filter mass upon the ribbed surface of the plates as thus formed provides lines of least density in the grooves between the ribs which constitute channels through which the liquid may pass from the pulp to the peripheral canal or vice versa.

The several filter elements constructed as above described are made to interlock with each other when assembled in the press by means of a special form of rabbet joint formation which operates to clamp the pulp mass with relatively great pressure around its margin or edge, so that the liquid entering by the canal of one conductor plate will be compelled to pass through the filter mass rather than around its edge, in order to reach the adjacent outlet conductor.

In Fig. 4 the rabbet formation on the upper rim of the filter elements there shown, is represented by the upstanding cylindrical wall 9 of the shell, which constitutes the rabbet-tenon member, and an inner rabbet recess, marked 23, which forms a jog 24. The lower rim has a corresponding inner rabbet tenon member 25, which is of less depth than the rabbet recess 23 so that when one shell is placed upon the other, as shown in the drawings, a space will be provided between the said inner tenon 25 and the jog 24 to receive the margin of the filter mass and compress the same when the filter elements are pressed together. The increased pressure thus produced and resulting in a greater marginal density of the mass renders it relatively impervious to the liquid and hence prevents contact thereof with the metal surface of the shell wall as well as prevents passage of the liquid around the filter mass instead of through it. The jog 24 and the inner rabbet rim 25, moreover, being respectively above and below their adjacent ribs 20, serve to hold the pulp mass from entering and obstructing their circular canals 21, a matter of obvious advantage. The opposing faces of the outer rabbet joint members as well as the opposing faces of the shell around the conduit perforations are separated by a compressible gasket 26, which in the present case is counter-sunk in the uppermost face in each case. When the elements are pressed together, the pulp is compressed thereby and particularly at the edges, until the gaskets meet to form a liquid-tight connection, as will be fully understood, the terminal plates 1 and 4 being correspondingly formed and provided with gaskets or proper joint surfaces to complete the liquid inclosure.

In the form of filter element shown in Fig. 3, the rabbet joint formation is slightly modified to provide greater certainty against obstruction of the circular canals 21 from the entrance of pulp or filter mass therein. In this form the jog 24' and lower rabbet rim 25' are beveled at complementary angles and are also undercut as shown at 27, to form an enlargement of the canal which will be protected from the pressure of the pulp and hence be kept open. The filter mass, however, is without support for only a short distance from the jog to the beginning of the ribs, and is not bent over the sharp corner of the jog, as in the case of Fig. 4, so that it is therefore less likely to become deformed or disintegrate and deposit portions of the pulp in the liquid canal.

Claims:

1. In a sectional filter, a filter element consisting of a shell wall with a liquid passage and a bottom plate permanently secured thereto and provided on both sides with ribs in direct contact with the pulp affording a multiplicity of narrow conducting channels in its surfaces, and peripheral canals serving said channels, the upper rim of said wall formed with an exterior rabbet-tenon and an interior rabbet-groove or recess and jog and the lower rim thereof formed with an interior rabbet-tenon of materially less depth than the said rabbet-groove and adapted to fit inside the exterior rabbet-tenon of a similar juxtaposed filter element to form a filter drum, said jog and interior rabbet-tenon being respectively in planes above and below the opposite ribbed sides of the bottom plate and constituting clamps for the marginal portions of filter layers which are thus compressed between planes removed from the ribbed sides of the plates.

2. In a sectional filter, two filter elements constituting sections thereof and each consisting of a shell wall having a bottom plate permanently secured thereto and provided with ribs affording a multiplicity of narrow conducting channels in its surface, the upper rim of said wall formed with an exterior tenon and an interior recess and the lower rim thereof formed with an interior rabbet-tenon of materially less depth than the said recess, in combination with a layer of filtering material filling the chamber between said plates and contacting directly with both, the interior rabbet-tenon of one shell fitting inside the exterior tenon of the other shell, and the margin of said filter layer being compressed between said interior rabbet-tenon and the bottom of said recess to a thickness materially less than the body of the layer so as to be offset from said ribs and rendered practically impervious.

3. In a sectional filter, a pan-shaped filter element consisting of a shell wall having a bottom plate ribbed in its central portion and provided with a peripheral liquid canal, the upper rim of the shell formed with an outer rabbet-tenon and an inner rabbet groove providing a jog above the said canal, and the lower rim formed of an inner rabbet-tenon of less depth than said groove and adapted to fit in the upper rabbet grooves of other like elements.

4. In a sectional filter, a pulp-containing filter element comprising a bottom plate having non-uniform bearing upon the pulp, thereby providing channels for conducting liquid to or from the same, a shell wall surrounding the edge of said plate and supplied with an under-cut jog providing a peripheral canal communicating with said channels.

5. In a sectional filter, a plurality of juxtaposed filter elements each comprising a shell wall having a permanent liquid-conducting bottom plate, the upper rim of said wall being formed with an outer rabbet-tenon and an inner jog projecting over the marginal face of the bottom-plate to form a liquid-conducting canal therefor, and the lower rim being formed with an inner rabbet tenon adapted to clamp the margin of the filter mass upon the jog of an adjacent like element.

6. A filter composed of a series of successively juxtaposed filter elements, containing filter-mass and each serving to confine and press the filter mass in its neighbor, said elements each comprising an outer shell wall 9 having apertures 12 and 13 in its lower side and apertures 14 and 15 in its upper side, said apertures being formed in projecting lug portions of the wall and being arranged in registry with like apertures in adjacent elements, a ribbed bottom plate 16 permanently secured to the shell wall and having the canals 21, and communicating passages 12', 14', and 13', 15', from said canals to said registering apertures, and the pulp-clamping members 24 and 25 arranged respectively on opposite sides of each element and respectively above and below the opposite ribbed sides of said bottom plate, to clamp the margin of the filter-mass in each element.

In testimony whereof, I have signed this specification in the presence of two witnesses.

BENNO DANZIGER.

Witnesses:
  ALFRED O. TITTMANN,
  S. H. SHANK.